United States Patent
Pouran Ben Veyseh et al.

(10) Patent No.: US 12,032,907 B2
(45) Date of Patent: Jul. 9, 2024

(54) TRANSFER LEARNING AND PREDICTION CONSISTENCY FOR DETECTING OFFENSIVE SPANS OF TEXT

(71) Applicant: ADOBE INC., San Jose, CA (US)

(72) Inventors: Amir Pouran Ben Veyseh, Eugene, OR (US); Franck Dernoncourt, San Jose, CA (US)

(73) Assignee: ADOBE INC., San Jose, CA (US)

( * ) Notice: Subject to any disclaimer, the term of this patent is extended or adjusted under 35 U.S.C. 154(b) by 272 days.

(21) Appl. No.: 17/366,289

(22) Filed: Jul. 2, 2021

(65) Prior Publication Data
US 2023/0016729 A1   Jan. 19, 2023

(51) Int. Cl.
| | |
|---|---|
| G06F 40/20 | (2020.01) |
| G06F 40/279 | (2020.01) |
| G06F 40/30 | (2020.01) |
| G06N 3/045 | (2023.01) |
| G06N 3/096 | (2023.01) |

(52) U.S. Cl.
CPC ................. G06F 40/279 (2020.01)

(58) Field of Classification Search
CPC ...... G06F 40/20; G06F 40/253; G06F 40/279; G06F 40/284; G06F 40/289; G06F 40/30; G06N 3/045; G06N 3/096
USPC ...................... 704/1, 9; 706/12, 20
See application file for complete search history.

(56) References Cited

U.S. PATENT DOCUMENTS

| | | | | |
|---|---|---|---|---|
| 8,874,434 | B2 * | 10/2014 | Collobert | G06F 40/289 |
| | | | | 706/26 |
| 2011/0191097 | A1 * | 8/2011 | Spears | G06F 40/40 |
| | | | | 704/9 |
| 2019/0325029 | A1 * | 10/2019 | Gandhi | G06F 40/284 |
| 2020/0126533 | A1 * | 4/2020 | Doyle | G06F 40/30 |

(Continued)

FOREIGN PATENT DOCUMENTS

| | | | | |
|---|---|---|---|---|
| CA | 3146673 A1 * | 7/2022 | ........... | G06F 40/205 |
| EP | 4036785 A1 * | 8/2022 | ........... | G06F 40/284 |

OTHER PUBLICATIONS

Borkan, et al., "Nuanced Metrics for Measuring Unintended Bias with Real Data for Text Classification", In Companion proceedings of the 2019 World Wide Web Conference, pp. 491-500, arXiv preprint arXiv:1903.04561v2 [cs.LG] May 8, 2019.

(Continued)

*Primary Examiner* — Martin Lerner
(74) *Attorney, Agent, or Firm* — CHAU & ASSOCIATES, LLC

(57) ABSTRACT

Systems and methods for natural language processing are described. One or more embodiments of the present disclosure receive a span of text comprising an offensive span and a non-offensive span, generate a contextualized word embedding for each of a plurality of words of the span of text, generate a refined vector representation for each of the plurality of words based on the corresponding contextualized word embedding using a refinement network trained for offensive text recognition, generate label information for each of the plurality of words based on the corresponding refined vector representation, wherein the label information indicates whether each of the plurality of words includes offensive text, and transmit an indication of a location of the offensive span based on the label information.

15 Claims, 11 Drawing Sheets

(56) References Cited

U.S. PATENT DOCUMENTS

| | | | |
|---|---|---|---|
| 2020/0142999 A1* | 5/2020 | Pedersen | G06N 20/00 |
| 2021/0248316 A1* | 8/2021 | Wroczynski | G06F 40/279 |
| 2021/0383195 A1* | 12/2021 | Gygli | G06N 3/045 |
| 2022/0284884 A1* | 9/2022 | Tongya | G06F 40/242 |
| 2022/0318520 A1* | 10/2022 | Pouran Ben Veyseh | G06N 3/09 |
| 2022/0358366 A1* | 11/2022 | Lee | G06N 3/084 |

OTHER PUBLICATIONS

Peyré, et al., "Computational Optimal Transport with Applications to Data Science", In Foundations and Trends in Machine Learning, 2019, 54 pages.

Wulczyn, et al., "Ex Machina: Personal Attacks Seen at Scale", In Proceedings of the 26th International Conference on World Wide Web, pp. 1391-1399, arXiv preprint arXiv:1610.08914v2 [cs.CL] Feb. 25, 2017.

Xu, et al., "Double Embeddings and CNN-based Sequence Labeling for Aspect Extraction", Proceedings of the 56th Annual Meeting of the Association for Computational Linguistics (Short Papers), pp. 592-598, 2018.

Yin, et al., "Unsupervised Word and Dependency Path Embeddings for Aspect Term Extraction", Proceedings of the Twenty-Fifth International Joint Conference on Artificial Intelligence (IJCAI-16), pp. 2979-2985, 2016.

* cited by examiner

TRANSFER LEARNING AND PREDICTION CONSISTENCY FOR DETECTING OFFENSIVE SPANS OF TEXT

BACKGROUND

The following relates generally to natural language processing, and more specifically to offensive span identification using machine learning techniques.

Natural language processing (NLP) refers to techniques for using computers to interpret or generate natural language. In some cases, NLP tasks involve assigning annotation data such as grammatical information to words or phrases within a natural language expression. Different classes of machine-learning algorithms have been applied to NLP tasks. Some algorithms, such as decision trees, utilize hard if-then rules. Other systems use neural networks or statistical models which make soft, probabilistic decisions based on attaching real-valued weights to input features. These models can express the relative probability of multiple answers.

Sentiment analysis, toxicity detection, and opinion word extraction are sub-tasks of NLP. Certain words of text express a negative attitude and/or make the text sound offensive. In some examples, sentiment analysis systems predict a sentiment polarity (e.g., positive, negative, neutral) associated with input text. These systems rely on the existence of target opinion (i.e., the word or phrase that the text has a sentiment polarity towards it) to identify the words of the opinion concerning the target word.

However, conventional natural language processing systems do not differentiate between individual words in a phrase, nor can they identify the offensive span constituting the toxic text. Therefore, there is a need in the art for improved offensive span detection systems that can indicate a location of the offensive span.

SUMMARY

The present disclosure describes systems and methods for natural language processing. Some embodiments of the disclosure include a natural language processing apparatus configured to generate a refined vector representation for each of a set of words, generate label information for the words, and subsequently transmit an indication of a location of the offensive span based on the label information. For example, a machine learning model (i.e., an offensive span detection network of the apparatus) may be trained to predict offensive span of the text based on a multi-task loss function. The offensive span detection network is further trained on an auxiliary task of opinion word extraction using transfer learning techniques. The network is also trained to increase prediction consistency across similar inputs using a mapping component.

A method, apparatus, and non-transitory computer readable medium for natural language processing are described. One or more embodiments of the method, apparatus, and non-transitory computer readable medium include receiving a span of text comprising an offensive span and a non-offensive span, generating a contextualized word embedding for each of a plurality of words of the span of text, generating a refined vector representation for each of the plurality of words based on the corresponding contextualized word embedding using a refinement network trained for offensive text recognition, generating label information for each of the plurality of words based on the corresponding refined vector representation, wherein the label information indicates whether each of the plurality of words comprises offensive text, and transmitting an indication of a location of the offensive span based on the label information.

An apparatus and method for natural language processing are described. One or more embodiments of the apparatus and method include a word embedding component configured to generate a contextualized word embedding for each of a plurality of words of text, a refinement network configured to generate a refined vector representation for each of the plurality of words based on the corresponding contextualized word embedding using a sequential neural network trained for offensive text recognition, and a classification network configured to generate label information for each of the plurality of words based on the corresponding refined vector representation, wherein the label information indicates whether each of the plurality of words comprises offensive text.

A method, apparatus, and non-transitory computer readable medium for training a network are described. One or more embodiments of the method, apparatus, and non-transitory computer readable medium include identifying training data including text and ground truth label information for the text, generating a contextualized word embedding for each of a plurality of words of the text, generating a refined vector representation for each of the plurality of words based on the corresponding contextualized word embedding using a refinement network trained for offensive text recognition, generating label information for each of the plurality of words based on the corresponding refined vector representation, wherein the label information indicates whether each of the plurality of words comprises offensive text, computing a prediction loss based on the ground-truth label information and the generated label information, and updating parameters of the refinement network based on the prediction loss.

DETAILED DESCRIPTION

Figure 1:
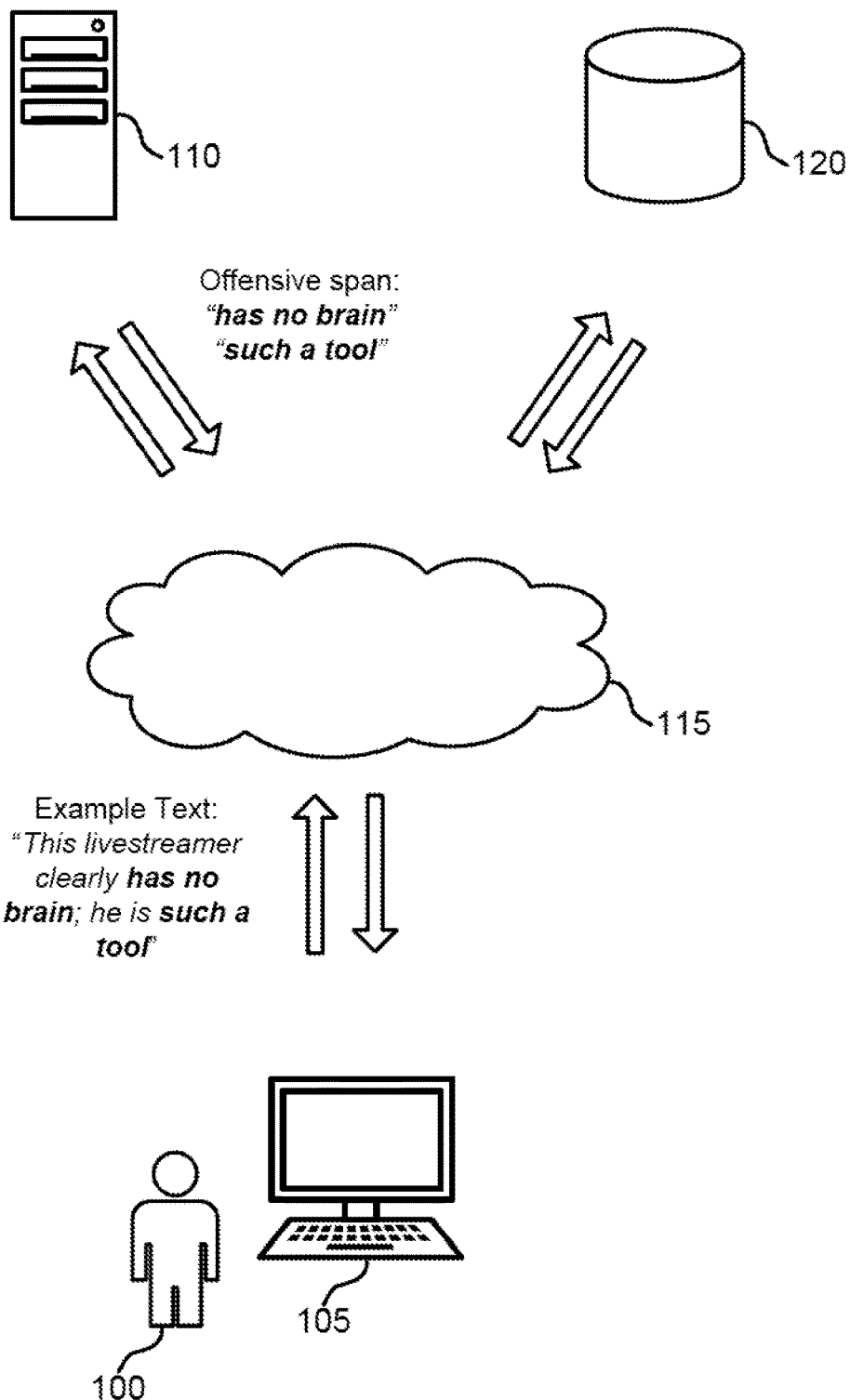
FIG. 1 shows an example of a natural language processing system according to aspects of the present disclosure.

The present disclosure describes systems and methods for natural language processing. Some embodiments of the disclosure include a natural language processing apparatus configured to generate a refined vector representation for each of a set of words, generate label information for the words, and subsequently identify a location of the offensive span based on the label information. For example, a machine learning model (i.e., an offensive span detection network of the apparatus) may be trained to predict an offensive span of the text based on a multi-task loss function. In some embodiments, the offensive span detection network is further trained on an auxiliary task of opinion word extraction using transfer learning techniques. The network may also be trained to increase prediction consistency across similar inputs using a mapping component.

Recently, machine learning models such as deep convolutional neural networks (CNNs) have been used for toxicity detection and opinion extraction. Models of toxicity detection use feature-based techniques and classify input text either as toxic or non-toxic. However, these feature-based models cannot recognize the specific location of an offensive span in the text, where the offensive span leads to the toxicity of the text. Thus, conventional detection models are limited to assign a probability to each text for being toxic and fail to differentiate individual words in a phrase. Additionally, in some examples, context-based recurrent neural networks (RNNs) and graph-based neural networks may be used for opinion word extraction. Existing conventional models depend on the existence of target opinion (i.e., the word or phrase that the text has a sentiment polarity towards). But, in some cases, there is no opinion word in the input text for detecting offensive span of the text.

Embodiments of the present disclosure include a neural network trained to identify the offensive span of input text (i.e., toxic parts). An offensive span detection network (main network) is simultaneously trained on an auxiliary task for opinion words extraction using transfer learning techniques. In some examples, the offensive span detection network is trained using a multi-task loss function, which includes prediction loss, auxiliary loss, regularization loss, and consistency loss. A pre-trained sentiment analysis network guides the main network to learn distinguishing opinion words from the context. Furthermore, a mapping component is used to train the main network to ensure consistency of model prediction across similar inputs (e.g., ensure similar model predictions for input documents that are similar to each other).

Some embodiments of the present disclosure include a natural language processing apparatus that receives a span of text including an offensive span and a non-offensive span. The apparatus then generates a refined vector representation for each of the words using a refinement network trained for offensive text recognition. Subsequently, the apparatus generates label information based on the corresponding refined vector representation, and the label information indicates whether each of the words includes offensive text. The natural language processing apparatus is able to identify offensive span regardless of any target opinion.

Embodiments of the present disclosure may be used in the context of content management. For example, an offensive span detection system based on the present disclosure may be used to identify a location of the offensive span and users can remove offensive content based on the location. This is useful when input text is lengthy and manual recognition of offensive parts is time-consuming. An example application in the offensive span identification is provided with reference to FIGS. 1-2. Details regarding the architecture of an example natural language processing apparatus are provided with reference to FIGS. 3-4. Examples of a process for training an offensive span detection network are provided with reference to FIGS. 7-11.

Offensive Span Identification System

FIG. 1 shows an example of a natural language processing system according to aspects of the present disclosure. The example shown includes user 100, user device 105, natural language processing apparatus 110, cloud 115, and database 120.

In the example of FIG. 1, natural language processing apparatus 110 receives text having an offensive span and a non-offensive span. For example, the text may be a comment from a commentator on a media platform, "This livestreamer clearly has no brain; he is such a tool!". The offensive span part of the text is "has no brain" and "such a tool" (tool is a slang for idiot).

The user 100 communicates with the natural language processing apparatus 110 via the user device 105 and the cloud 115. For example, the user 100 may be a platform administrator analyzing text comments. As illustrated in FIG. 1, an example text includes an offensive span and a non-offensive span. The user device 105 transmits the text to the natural language processing apparatus 110 to find a location of the offensive span. In some examples, the user device 105 communicates with the natural language processing apparatus 110 via the cloud 115.

Accordingly, natural language processing apparatus 110 generates a contextualized word embedding for each of words of the text. Natural language processing apparatus 110 generates a refined vector representation for each of the words based on the corresponding contextualized word embedding using a refinement network trained for offensive text recognition. Subsequently, natural language processing apparatus 110 generates label information for each of the words based on the corresponding refined vector representation. The label information indicates whether each of the words includes offensive text. Natural language processing apparatus 110 transmits an indication of the offensive span based on the label information.

The user device 105 may be a personal computer, laptop computer, mainframe computer, palmtop computer, personal assistant, mobile device, or any other suitable processing apparatus. In some examples, the user device 105 includes software that incorporates a natural language analysis application. The natural language analysis application may either include or communicate with the natural language processing apparatus 110.

Alternatively or additionally, the user device 105 includes a user interface so that a user 100 can upload text or document via the user interface. A user interface may enable a user to interact with a device. In some embodiments, the user interface may include an audio device, such as an external speaker system, an external display device such as a display screen, or an input device (e.g., remote control device interfaced with the user interface directly or through an IO controller module). In some cases, a user interface may be a graphical user interface (GUI).

Natural language processing apparatus 110 includes a computer implemented network comprising a word embedding component, a refinement network, a classification network, offensive span component, sentiment analysis network, and a mapping component. The network receives a span of text including an offensive span and a non-offensive span. The network generates a contextualized word embedding for each of words of the span of text. The network generates a refined vector representation for each of the words based on the corresponding contextualized word embedding using a refinement network trained for offensive text recognition. The network generates label information for each of the plurality of words based on the corresponding refined vector representation, where the label information indicates whether each of the plurality of words includes offensive text. The network transmits an indication of a location of the offensive span based on the label information.

According to some embodiments, natural language processing apparatus 110 receives the text from a user 100. Natural language processing apparatus 110 removes the offensive span from the span of text based on the indication. Natural language processing apparatus 110 generates filtered text for displaying based on removing the offensive span.

The term "offensive span" is a set of words in a span of text (e.g., a document), which are considered offensive according to social norms or under relevant context settings. In some examples, there may be one or more consecutive words in the offensive span of a given text. Multiple offensive spans may exist in the same text and start at different locations of the text. The term "contextualized word embedding" are vector representation of words of text (e.g., a document). In some examples, contextualized word embedding is obtained from a last layer of BERT transformer model. The term "refined vector representation" is fine-tuned vector representations of words of the text. In some examples, a bi-directional LSTM layer captures a sequential order of the words of text. The hidden states obtained from the Bi-LSTM layer are the refined vector representation. Refined vector representation is then input to a decoder such as a feed-forward layer for model prediction.

Natural language processing apparatus 110 may also include a processor unit, a memory unit, and a training component. Additionally, natural language processing apparatus 110 can communicate with the database 120 via the cloud 115. In some cases, the architecture of the natural language processing network is also referred to as a network model or a network. Further detail regarding the architecture of natural language processing apparatus 110 is provided with reference to FIGS. 3-4. Further detail regarding a process for natural language processing is provided with reference to FIGS. 5-6. Further detail regarding the training of natural language processing apparatus 110 is provided with reference to FIGS. 7-11.

In some cases, natural language processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

A cloud 115 is a computer network configured to provide on-demand availability of computer system resources, such as data storage and computing power. In some examples, the cloud 115 provides resources without active management by the user. The term cloud 115 is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud 115 includes a multi-layer communications network comprising multiple edge routers and core routers. In another example, a cloud 115 is based on a local collection of switches in a single physical location.

A database 120 is an organized collection of data. For example, a database 120 stores data in a specified format known as a schema. A database 120 may be structured as a single database, a distributed database, multiple distributed databases, or an emergency backup database. In some cases, a database controller may manage data storage and processing in a database 120. In some cases, a user interacts with database controller. In other cases, database controller may operate automatically without user interaction.

Figure 2:
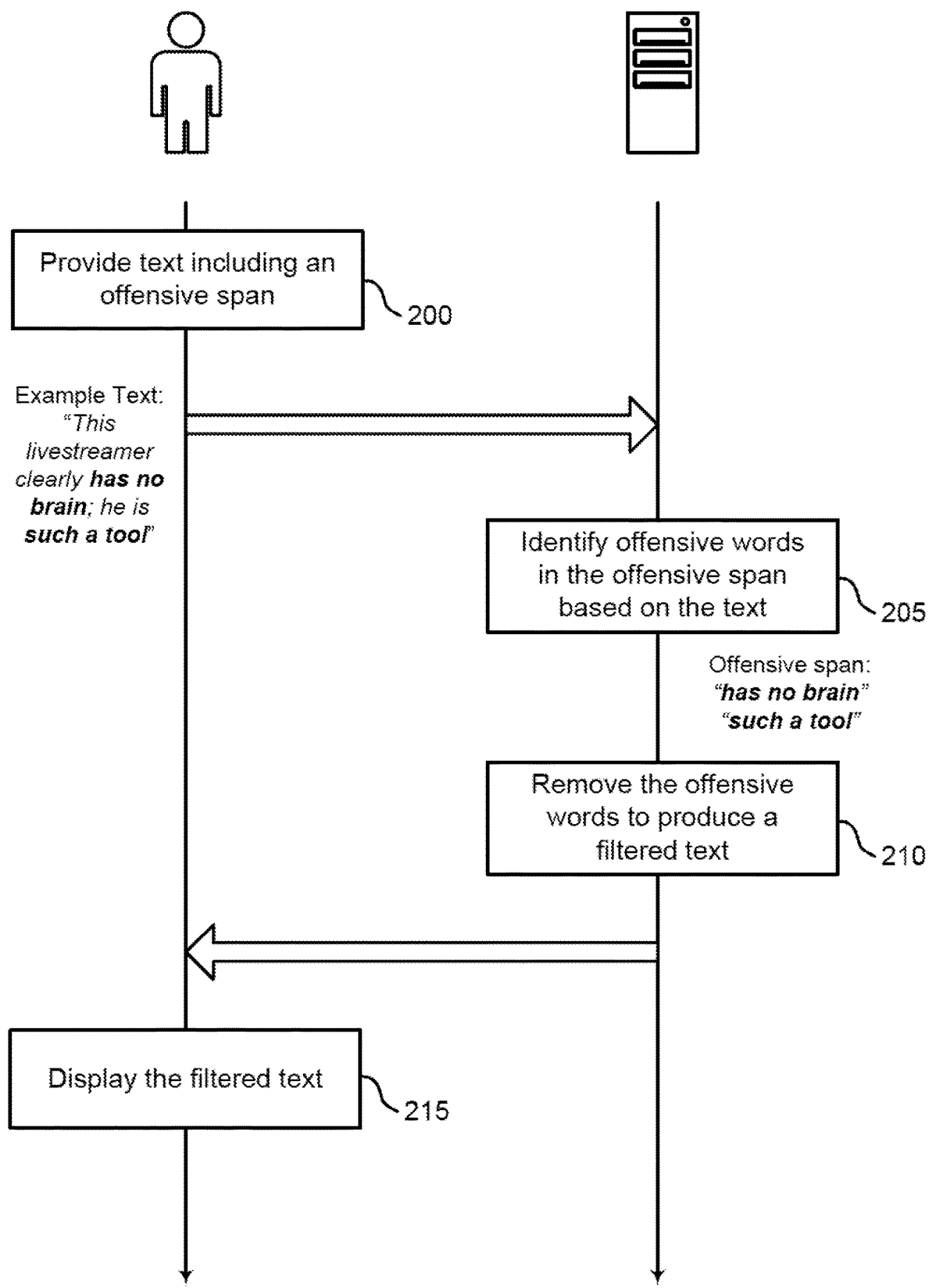
FIG. 2 shows an example of a process for natural language processing according to aspects of the present disclosure.

FIG. 2 shows an example of a process for natural language processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 200, the user provides text including an offensive span. As the example illustrated in FIG. 1, the text may be a comment from a commentator on a media platform, "This livestreamer clearly has no brain; he is such a tool!". The text has an offensive span and a non-offensive span. The offensive span part of the text is "has no brain" and "such a tool" (tool is a slang for idiot). A platform administrator is interested in knowing the location of the offensive span given the text comment. In some cases, the operations of this step refer to, or may be performed by, a user or a user operating a user device as described with reference to FIG. 1. In some examples, the user is the platform administrator.

At operation 205, the system identifies offensive words in the offensive span based on the text. The user communicates with the natural language processing apparatus (see FIG. 1). The user device transmits the text to the natural language processing apparatus 110 to find a location of the offensive span. Accordingly, natural language processing apparatus 110 generates a contextualized word embedding for each of words of the text. Natural language processing apparatus 110 generates label information for each of the words. The label information indicates whether each of the words includes offensive text. The system transmits an indication of the offensive span based on the label information. In some cases, the operations of this step refer to, or may be performed by, a natural language processing apparatus as described with reference to FIG. 1.

At operation 210, the system removes the offensive words to produce a filtered text. In the above example, "has no brain" and "such a tool" are identified as offensive span and will be removed. In some examples, the user (e.g., the platform administrator) can remove the identified offensive span manually if he or she choose to do so. However, in practice, the input text or document may be lengthy and complex. For example, a popular video may draw thousands of comments or posts. Some of the comments involve offensive span of text and may be filtered automatically by the system. In some cases, the operations of this step refer to, or may be performed by, a natural language processing apparatus as described with reference to FIG. 1.

At operation 215, the system displays the filtered text. The user can view the filtered text and make further actions (e.g., keep the filtered text, further edit the filtered text). The user can upload different text for identifying the location of offensive span and filtering. In some cases, the operations of this step refer to, or may be performed by, a user device as described with reference to FIG. 1.

Network Architecture

Figure 3:
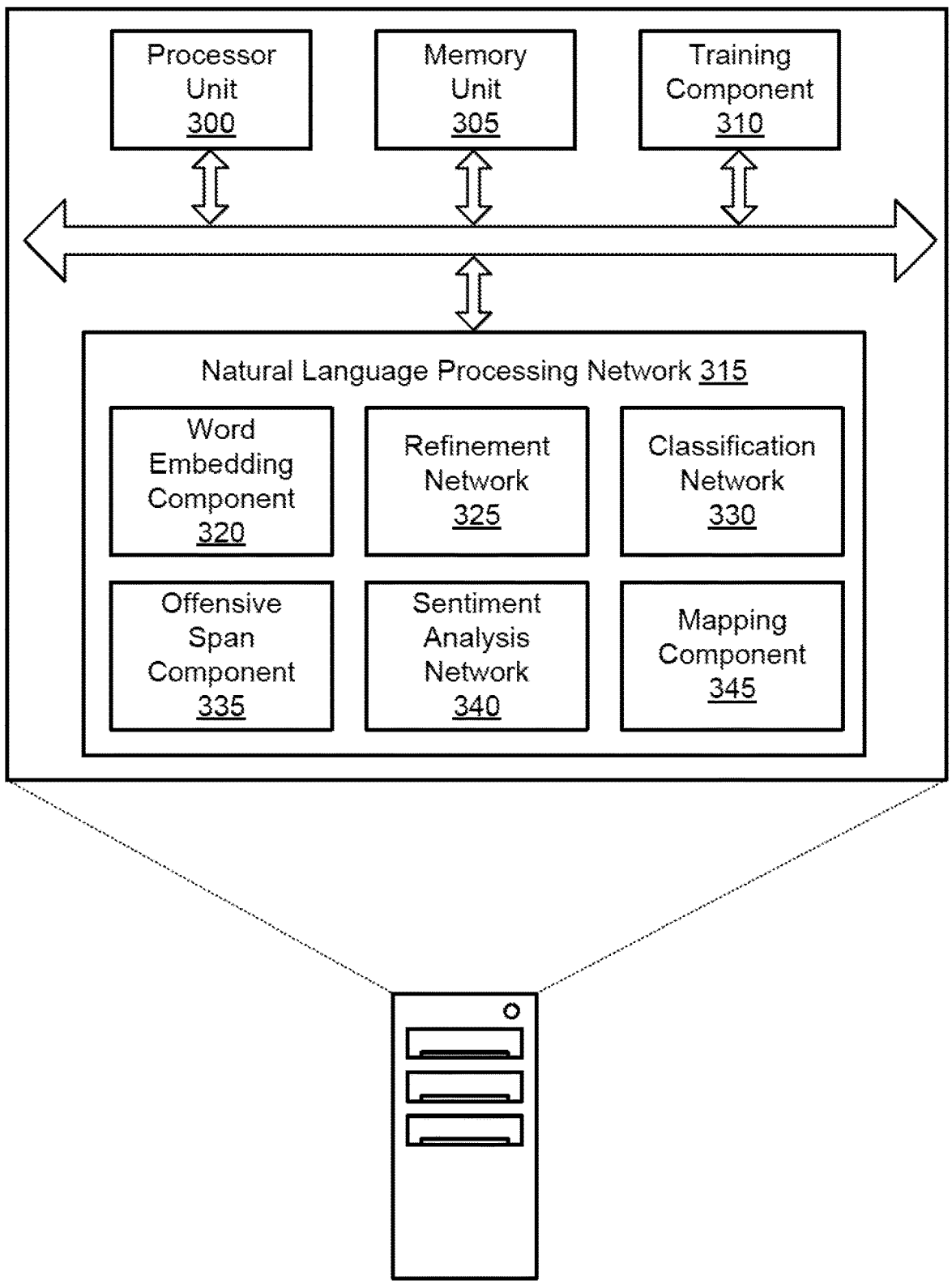
FIG. 3 shows an example of a natural language processing apparatus according to aspects of the present disclosure.
Figure 4:
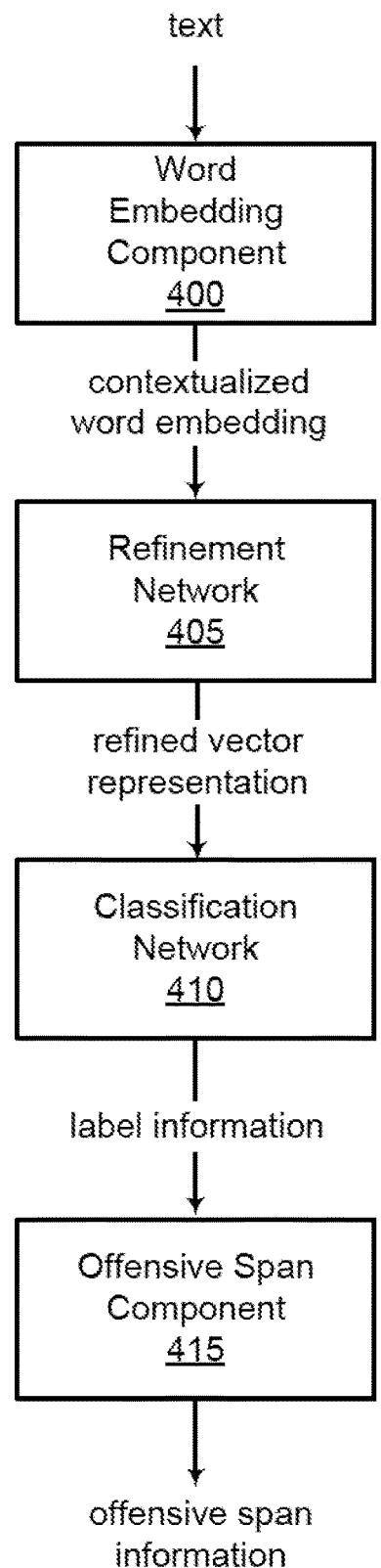
FIG. 4 shows an example of a natural language processing diagram according to aspects of the present disclosure.

In FIGS. 3-4, an apparatus and method for natural language processing are described. One or more embodiments of the apparatus and method include a word embedding component configured to generate a contextualized word embedding for each of a plurality of words of text, a refinement network configured to generate a refined vector representation for each of the plurality of words based on the corresponding contextualized word embedding using a sequential neural network trained for offensive text recognition, and a classification network configured to generate label information for each of the plurality of words based on the corresponding refined vector representation, wherein the label information indicates whether each of the plurality of words comprises offensive text.

Some examples of the apparatus and method further include an offensive span component configured to identify and transmit information indicating an offensive span based on the label information.

In some examples, the word embedding component comprises a pre-trained transformer network. In some examples, the refinement network comprises a recurrent neural network (RNN). In some examples, the refinement network comprises a bi-directional long short-term memory (LSTM). In some examples, the classification network comprises a feed-forward neural network.

Some examples of the apparatus and method further include a sentiment analysis network configured to generate sentiment polarity for each of the plurality of words. Some examples of the apparatus and method further include a mapping component configured to identify similar documents, wherein the refinement network is trained based on the similar documents.

FIG. 3 shows an example of a natural language processing apparatus according to aspects of the present disclosure. The example shown includes processor unit 300, memory unit 305, training component 310, natural language processing network 315, word embedding component 320, refinement network 325, classification network 330, offensive span component 335, sentiment analysis network 340, and mapping component 345.

A processor unit 300 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 300 is configured to operate a memory array using a memory controller. In other cases, a memory controller is integrated into the processor. In some cases, the processor unit 300 is configured to execute computer-readable instructions stored in a memory to perform various functions. In some embodiments, a processor unit 300 includes special purpose components for modem processing, baseband processing, digital signal processing, or transmission processing.

Examples of a memory unit 305 include random access memory (RAM), read-only memory (ROM), or a hard disk. Examples of memory unit 305 include solid state memory and a hard disk drive. In some examples, a memory unit 305 is used to store computer-readable, computer-executable software including instructions that, when executed, cause a processor to perform various functions described herein. In some cases, the memory unit 305 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 305 store information in the form of a logical state.

According to some embodiments of the present disclosure, the natural language processing apparatus includes a computer implemented artificial neural network (ANN) that receives a span of text including an offensive span and a non-offensive span. The natural language processing apparatus generates label information for each of words in the span of text and then transmits an indication of a location of the offensive span based on the label information. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments of the present disclosure, the refinement network 325 includes a recurrent neural network (RNN). RNN is a class of ANN in which connections between nodes form a directed graph along an ordered (i.e., a temporal) sequence. This enables an RNN to model temporally dynamic behavior such as predicting what element should come next in a sequence. Thus, an RNN is suitable for tasks that involve ordered sequences such as text recognition (where words are ordered in a sentence). The term RNN may include finite impulse recurrent networks (characterized by nodes forming a directed acyclic graph), and infinite impulse recurrent networks (characterized by nodes forming a directed cyclic graph).

A long short-term memory (LSTM) is a form of RNN that includes feedback connections. In one example, and LSTM includes a cell, an input gate, an output gate and a forget gate. The cell stores values for a certain amount of time, and the gates dictate the flow of information into and out of the cell. LSTM networks may be used for making predictions based on series data where there can be gaps of unknown size between related information in the series. LSTMs can help mitigate the vanishing gradient (and exploding gradient) problems when training an RNN.

According to some examples, a word embedding is a learned representation for text where words that have the same meaning have a similar representation. Glove and Word2vec are examples of systems for obtaining a vector representation of words. GloVe is an unsupervised algorithm for training a network using on aggregated global word-word co-occurrence statistics from a corpus. Similarly, a Word2vec model may include a shallow neural network trained to reconstruct the linguistic context of words. GloVe and Word2vec models may take a large corpus of text and produces a vector space as output. In some cases, the vector space may have a large number of dimensions. Each word in the corpus is assigned a vector in the space. Word vectors are positioned in the vector space in a manner such that similar words are located nearby in the vector space. In some cases, an embedding space may include syntactic or context information in additional to semantic information for individual words.

According to some embodiments, training component 310 identifies training data including text and ground truth label information for the text. Training component 310 computes a prediction loss based on the ground-truth label information and the generated label information. Then, training component 310 updates parameters of the refinement network 325 based on the prediction loss. In some examples, training component 310 updates parameters of a classification network 330 based the prediction loss, where the label information is generated by the classification network 330. In some examples, the prediction loss includes a negative log likelihood of the ground truth label information.

In some examples, training component 310 generates an attention score for each of the set of words based on the refined vector representation. Training component 310 generates a weighted vector representation based on the attention score and the refined vector representation. Training component 310 generates a probability that the weighted vector representation has a neutral sentiment polarity. Subsequently, training component 310 computes an auxiliary loss based on the probability, where the parameters of the refinement network 325 are updated based on the auxiliary loss. In some examples, training component 310 computes a sum of the attention score for each of the set of words. Training component 310 then computes a regularization loss based on the sum, where the parameters of the refinement network 325 are updated based on the regularization loss.

In some examples, training component 310 identifies ground truth sentiment polarity information. Training component 310 computes a sentiment analysis loss function based on the predicted sentiment polarity information and the ground truth sentiment polarity information. Subsequently, training component 310 updates parameters of the sentiment analysis network 340 based on the sentiment analysis loss function, where the probability that the weighted vector representation has the neutral sentiment polarity is generated using the sentiment analysis network 340.

In some examples, training component 310 computes a consistency loss based on the similarity score for each of the documents in the batch, where the parameters of the refinement network 325 are updated based on the consistency loss. Training component 310 is an example of, or includes aspects of, the corresponding element described with reference to FIG. 7.

According to some embodiments, word embedding component 320 generates a contextualized word embedding for each of a set of words of the span of text. In some examples, word embedding component 320 identifies a word including a set of word pieces. Word embedding component 320 generates a vector representation for each of the word pieces. In some examples, word embedding component 320 averages the vector representation for each of the word pieces to produce the contextualized word embedding. In some examples, the word embedding component 320 includes a pre-trained transformer network. Word embedding component 320 is an example of, or includes aspects of, the corresponding element described with reference to FIGS. 4 and 7.

According to some embodiments, refinement network 325 generates a refined vector representation for each of the set of words based on the corresponding contextualized word embedding trained for offensive text recognition.

According to some embodiments, refinement network 325 is a sequential neural network trained for offensive text recognition. In some examples, the refinement network 325 includes an RNN. In some examples, the refinement network 325 includes a bi-directional LSTM. According to some embodiments, refinement network 325 is trained for offensive text recognition and can generate a refined vector representation for each of the set of words based on the corresponding contextualized word embedding. Refinement network 325 is an example of, or includes aspects of, the corresponding element described with reference to FIGS. 4 and 7.

According to some embodiments, classification network 330 generates label information for each of the set of words based on the corresponding refined vector representation, where the label information indicates whether each of the set of words includes offensive text. In some examples, the label information includes a first value for a first label, a second value for a second label, and a third value for a third label, where the first label indicates a word is a first word of the offensive span, the second label indicates a word is within the offensive span, and the third label indicates a word is not within the offensive span. In some examples, the label information includes a probability distribution over a set of labels related to the offensive span. In some examples, classification network 330 includes a feed-forward neural network. Classification network 330 is an example of, or includes aspects of, the corresponding element described with reference to FIGS. 4 and 7.

According to some embodiments, offensive span component 335 transmits an indication of a location of the offensive span based on the label information. Offensive span component 335 is configured to identify and transmit information indicating an offensive span based on the label information. Offensive span component 335 is an example of, or includes aspects of, the corresponding element described with reference to FIG. 4.

According to some embodiments, sentiment analysis network 340 is configured to generate sentiment polarity for each of the set of words. Sentiment analysis network 340 predicts sentiment polarity information. Sentiment analysis network 340 is an example of, or includes aspects of, the corresponding element described with reference to FIG. 7.

According to some embodiments, mapping component 345 is configured to identify similar documents, wherein the refinement network 325 is trained based on the similar documents. Mapping component 345 is an example of, or includes aspects of, the corresponding element described with reference to FIG. 7.

According to some embodiments, mapping component 345 computes a similarity score for each pair of documents in a batch of the training data. Mapping component 345 selects a most similar document for each of the documents in the batch based on the similarity score. Subsequently, mapping component 345 computes a consistency score for each of the documents in the batch, where the consistency score includes the similarity score for the pair including a document and the corresponding most similar document.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 4 shows an example of a natural language processing diagram according to aspects of the present disclosure. The example shown includes word embedding component 400, refinement network 405, classification network 410, and offensive span component 415.

Some embodiments of the present disclosure include a deep learning model for detecting offensive spans of text. The natural language processing apparatus (see FIG. 1) includes a transfer-learning setting, along with multi-tasking, for simultaneously predicting the offensive spans and opinion words. A regularization technique based on optimal transport is used to increase the consistency of model predictions across similar inputs.

From top to bottom as the example illustrated in FIG. 4, text (e.g., a document) is input to word embedding component 400 to generate contextualized word embedding. Word embedding component 400 is an example of, or includes aspects of, the corresponding element described with reference to FIGS. 3 and 7.

Contextualized word embedding is then input to refinement network 405 to generate refined vector representation. Refinement network 405 is an example of, or includes aspects of, the corresponding element described with reference to FIGS. 3 and 7.

Refined vector representation is then input to classification network 410 to generate label information. The label information includes a probability information over a set of labels related to the offensive span. In some examples, the label for input text is a sequence of labels (e.g., a list of labels where each label corresponds to a word in the text). Each label is one of the labels from the set {B-Toxic, I-Toxic, O}. The label B-Toxic indicates the current word is the first word of an offensive span, the label I-Toxic indicates the word is inside an offensive span and the label O is used for other words. In some cases, the offensive span is also referred to as a toxic span. Classification network 410 is an example of, or includes aspects of, the corresponding element described with reference to FIGS. 3 and 7.

Subsequently, label information is input to offensive span component 415 to generate offensive span information. In some examples, the offensive span information includes a location of the offensive span in text based on the label information (e.g., the start and end location of the offensive span). The text may include multiple offensive spans. As the example shown in FIG. 1, the text there "This livestreamer clearly has no brain; he is such a tool" includes two offensive spans, "has no brain" and "such a tool". Offensive span component 415 is an example of, or includes aspects of, the corresponding element described with reference to FIG. 3.

Offensive Span Identification

Figure 5:
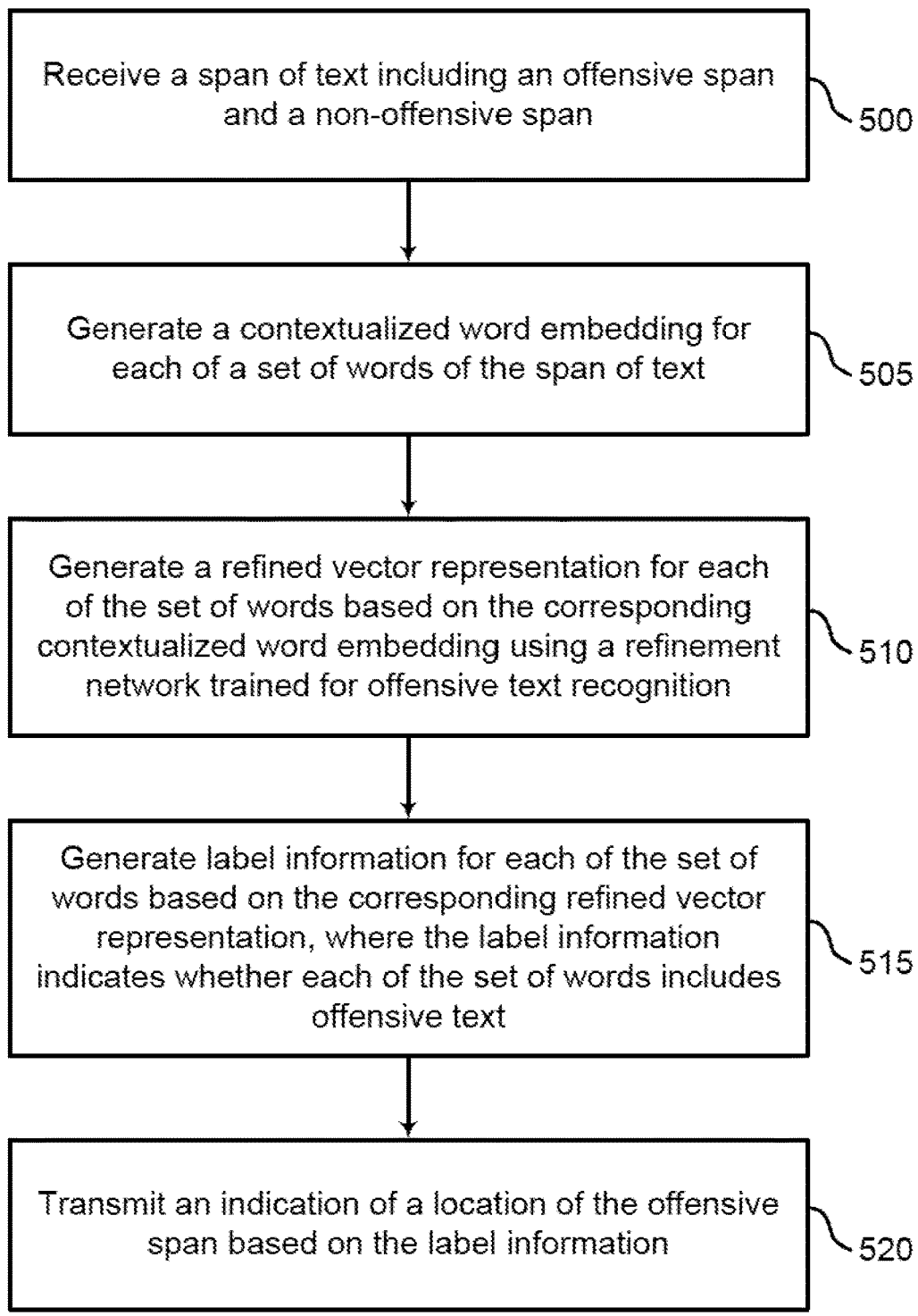
FIG. 5 shows an example of a process for natural language processing according to aspects of the present disclosure.
Figure 6:
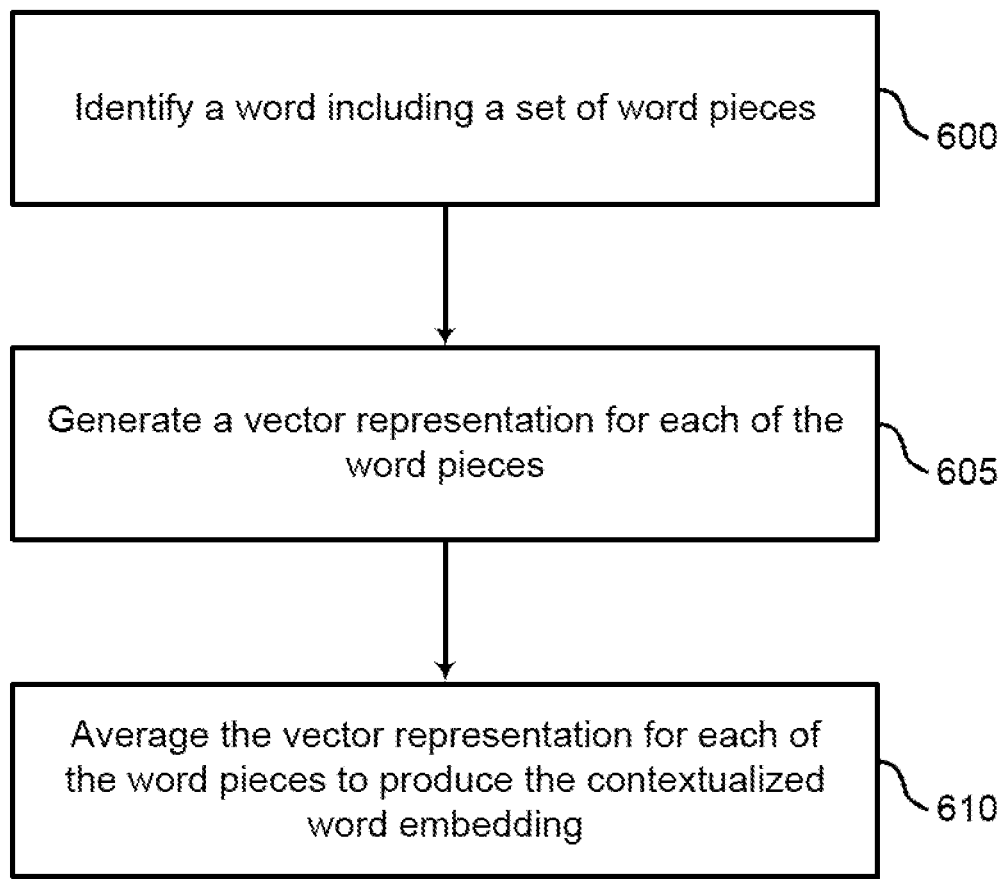
FIG. 6 shows an example of a process for generating vector representation for a word having multiple word pieces according to aspects of the present disclosure.

In FIGS. 5-6, a method, apparatus, and non-transitory computer readable medium for natural language processing are described. One or more embodiments of the method, apparatus, and non-transitory computer readable medium include receiving a span of text comprising an offensive span and a non-offensive span, generating a contextualized word embedding for each of a plurality of words of the span of text, generating a refined vector representation for each of the plurality of words based on the corresponding contextualized word embedding using a refinement network trained for offensive text recognition, generating label information for each of the plurality of words based on the corresponding refined vector representation, wherein the label information indicates whether each of the plurality of words comprises offensive text, and transmitting an indication of a location of the offensive span based on the label information.

Some examples of the method, apparatus, and non-transitory computer readable medium further include receiving the text from a user. Some examples further include removing the offensive span from the span of text based on the indication. Some examples further include generating filtered text for display based on removing the offensive span.

In some examples, the label information comprises a first value for a first label, a second value for a second label, and a third value for a third label, wherein the first label indicates a word is a first word of the offensive span, the second label indicates a word is within the offensive span, and the third label indicates a word is not within the offensive span. In some examples, the label information comprises a probability distribution over a plurality of labels related to the offensive span.

Some examples of the method, apparatus, and non-transitory computer readable medium further include identifying a word comprising a plurality of word pieces. Some examples further include generating a vector representation for each of the word pieces. Some examples further include averaging the vector representation for each of the word pieces to produce the contextualized word embedding.

FIG. 5 shows an example of a process for natural language processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 500, the system receives a span of text including an offensive span and a non-offensive span. In some cases, the operations of this step refer to, or may be performed by, a natural language processing apparatus as described with reference to FIG. 1.

In an embodiment, the system receives text (e.g., comments posted on a media platform) and is configured to identify words or phrases that express toxic opinions in the text that potentially express a negative connotation or inappropriate attitude. As an example, the text may include "this livestreamer clearly has no brain; he is such a tool!". A natural language processing network identifies the offensive spans of 'has no brain' and 'such a tool' (tool is a slang for idiot). The offensive span in the text may include one single word, one word having multiple word pieces (e.g., up-to-date is considered one word), or consecutive words.

The natural language processing network can automatically detect which parts of the text (e.g., a comment) are making the text offensive or toxic. A user would know the parts that are responsible for the toxicity of the text. As a result, a moderator or administrator of the media platform quickly recognizes the comments that should be removed due to their toxicity based on the identified offensive spans in the text.

At operation 505, the system generates a contextualized word embedding for each of a set of words of the span of text. In some cases, the operations of this step refer to, or may be performed by, a word embedding component as described with reference to FIGS. 3, 4, and 7.

In some embodiments, input to the system is a document including a set of words, e.g., $D=[w_1, w_2, \ldots, w_n]$ having n words. The label for the document is the sequence $Y=[y_1, y_2, \ldots, y_n]$ where $y_i$ is the label for $w_i$. Each label is one of the labels from the set {B-Toxic, I-Toxic, O}. The label B-Toxic indicates the current word is the first word of a toxic span, the label I-Toxic indicates the word is inside a toxic span and the label O is used for other words. In some cases, the toxic span is also referred to as an offensive span.

At operation 510, the system generates a refined vector representation for each of the set of words based on the corresponding contextualized word embedding using a refinement network trained for offensive text recognition. In some cases, the operations of this step refer to, or may be performed by, a refinement network as described with reference to FIGS. 3 and 7.

According to an embodiment, the network model for detecting offensive spans of text includes a fixed BERT model, an LSTM layer, and a feed-forward layer to predict the label for each word and identify whether each word is toxic. In some cases, the network model may also be referred to as a main network or an offensive span detection network. The offensive span detection network includes a refinement network. The input document D is input to the $BERT_{base}$ model to obtain contextualized word embeddings. The sequence $[CLS]w_1w_2 \ldots w_n[SEP]$ is the input to the BERT model and the representations obtained from the last layer of the BERT transformer, i.e., $X=[x_1, x_2, \ldots, x_n]$, are referred to as the word vector representations.

In some examples, words have multiple word-pieces, the offensive span detection network takes the average of the word-piece vector representations to construct the corresponding vector in X. In some examples, the parameters of the BERT model are fixed. A trainable layer is added and applied over the X vectors for fine-tuning for the current task (i.e., offensive span detection, which is also the main task). In an embodiment, a bi-directional LSTM (Bi-LSTM) layer is configured to capture the sequential order of the words in the document D. The hidden states obtained from the Bi-LSTM layer, i.e., $H=[h_1, h_2, \ldots, h_n]$, represent the fine-tuned vector representations of the input words. In some cases, the fine-tuned vector representations are also referred to as refined vector representation. A feed-forward layer is then used to predict the label of each word. A probability distribution is formulated as follows:

$$P(\cdot|D,w_i)=\text{softmax}(W_1*(W_2*h_i+b_1)+b_2) \quad (1)$$

where $W_1$ and $W_2$ are the weight matrices, $b_1$ and $b_2$ are biases, softmax is the softmax function, and $P(\cdot|D)$ represents the probability distribution of different labels predicted by the feed-forward layer for the word $w_i$. A cross-entropy loss in word-level (i.e., negative log-likelihood) is used to train the main network (i.e., offensive span detection network). Detail regarding computing the prediction loss will be described with reference to FIG. 8.

At operation 515, the system generates label information for each of the set of words based on the corresponding refined vector representation, where the label information indicates whether each of the set of words includes offensive text. As described in previous step 505, the label for the document is the sequence $Y=[y_1, y_2, \ldots, y_n]$ where $y_i$ is the label for $w_i$. Each label is one of the labels from the set {B-Toxic, I-Toxic, O}. The label B-Toxic indicates the current word is the first word of a toxic span, the label I-Toxic indicates the word is inside a toxic span and the label O is used for other words. In some cases, the operations of this step refer to, or may be performed by, a classification network as described with reference to FIGS. 3, 4, and 7.

At operation 520, the system transmits an indication of a location of the offensive span based on the label information. In some cases, the operations of this step refer to, or may be performed by, an offensive span component as described with reference to FIGS. 3 and 4.

As in the example above, the offensive span detection network identifies the offensive spans of "has no brain" and "such as tool" based on the input text ("tool" is a slang for idiot). A user (e.g., an administrator of a media platform) can take subsequent action based on the indication of the offensive span. For example, the user can easily locate the offensive span of the text and delete the offensive part.

FIG. 6 shows an example of a process for generating vector representation for a word having multiple word pieces according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 600, the system identifies a word including a set of word pieces. In some cases, the operations of this step refer to, or may be performed by, a word embedding component as described with reference to FIGS. 3, 4, and 7.

At operation 605, the system generates a vector representation for each of the word pieces. In some cases, the operations of this step refer to, or may be performed by, a word embedding component as described with reference to FIGS. 3, 4, and 7.

At operation 610, the system averages the vector representation for each of the word pieces to produce the contextualized word embedding. In some cases, the operations of this step refer to, or may be performed by, a word embedding component as described with reference to FIGS. 3, 4, and 7.

In some examples, a word may have multiple word pieces. An example is "up-to-date list", where the word or phrase "up-to-date" includes multiple word pieces. The offensive span detection network takes the average of the word-piece vector representations to construct the corresponding vector in X. Recall $X=[x_1, x_2, \ldots, x_n]$, are referred to as the word vector representations. In some examples, the parameters of the BERT model are fixed. A trainable layer is added and applied over the X vectors for fine-tuning for the current task (i.e., offensive span detection). In an embodiment, a bi-directional LSTM (Bi-LSTM) layer is configured to capture the sequential order of the words in the document D. The hidden states obtained from the Bi-LSTM layer, i.e., $H=[h_1, h_2, \ldots, h_n]$, represent the fine-tuned vector representations of the input words.

Training and Evaluation

In FIGS. 7-11, a method, apparatus, and non-transitory computer readable medium for training a network are described. One or more embodiments of the method, apparatus, and non-transitory computer readable medium include identifying training data including text and ground truth label information for the text, generating a contextualized word embedding for each of a plurality of words of the text, generating a refined vector representation for each of the plurality of words based on the corresponding contextualized word embedding using a refinement network trained for offensive text recognition, generating label information for each of the plurality of words based on the corresponding refined vector representation, wherein the label information indicates whether each of the plurality of words comprises offensive text, computing a prediction loss based on the ground-truth label information and the generated label information, and updating parameters of the refinement network based on the prediction loss.

Some examples of the method, apparatus, and non-transitory computer readable medium further include updating parameters of a classification network based the prediction loss, wherein the label information is generated by the classification network. In some examples, the prediction loss comprises a negative log likelihood of the ground truth label information.

Some examples of the method, apparatus, and non-transitory computer readable medium further include generating an attention score for each of the plurality of words based on the refined vector representation. Some examples further include generating a weighted vector representation based on the attention score and the refined vector representation.

Some examples further include generating a probability that the weighted vector representation has a neutral sentiment polarity. Some examples further include computing an auxiliary loss based on the probability, wherein the parameters of the refinement network are updated based on the auxiliary loss.

Some examples of the method, apparatus, and non-transitory computer readable medium further include computing a sum of the attention score for each of the plurality of words. Some examples further include computing a regularization loss based on the sum, wherein the parameters of the refinement network are updated based on the regularization loss.

Some examples of the method, apparatus, and non-transitory computer readable medium further include identifying ground truth sentiment polarity information. Some examples further include predicting sentiment polarity information using a sentiment analysis network. Some examples further include computing a sentiment analysis loss function based on the predicted sentiment polarity information and the ground truth sentiment polarity information. Some examples further include updating parameters of the sentiment analysis network based on the sentiment analysis loss function, wherein the probability that the weighted vector representation has the neutral sentiment polarity is generated using the sentiment analysis network.

Some examples of the method, apparatus, and non-transitory computer readable medium further include computing a similarity score for each pair of documents in a batch of the training data. Some examples further include selecting a most similar document for each of the documents in the batch based on the similarity score. Some examples further include computing a consistency score for each of the documents in the batch, wherein the consistency score comprises the similarity score for the pair comprising a document and the corresponding most similar document. Some examples further include computing a consistency loss based on the similarity score for each of the documents in the batch, wherein the parameters of the refinement network are updated based on the consistency loss.

Figure 7:
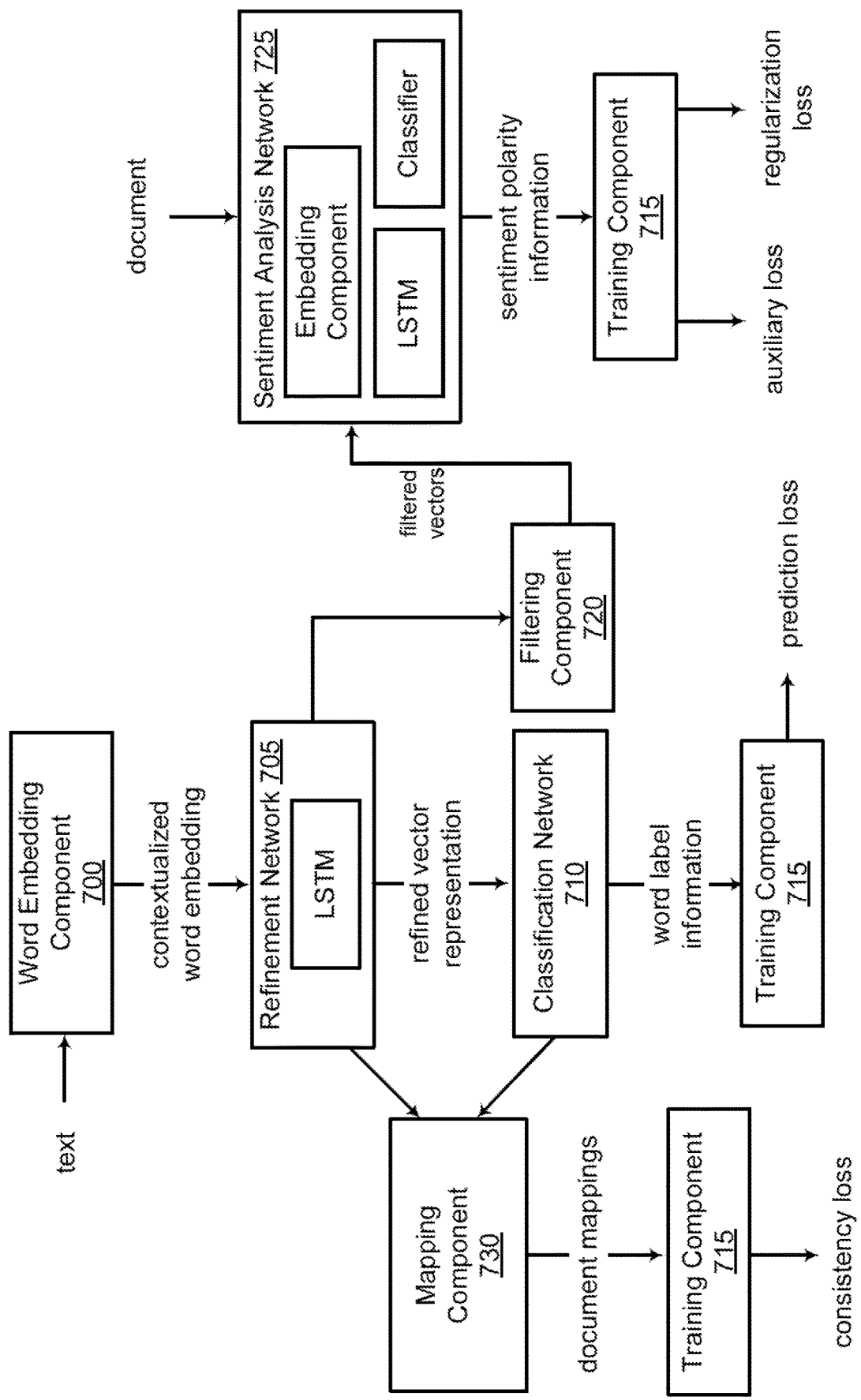
FIG. 7 shows an example of a process for training a refinement network using a mapping component according to aspects of the present disclosure.

FIG. 7 shows an example of a process for training a refinement network 705 using a mapping component 730 according to aspects of the present disclosure. The example shown includes word embedding component 700, refinement network 705, classification network 710, training component 715, filtering component 720, sentiment analysis network 725, and mapping component 730. According to some embodiments, an offensive span detection network herein includes at least word embedding component 700, refinement network 705, and classification network 710. In some cases, the offensive span detection network is also referred to as main network.

One or more embodiments of the present disclosure simultaneously train the natural language processing network on an auxiliary task of opinion word detection, in addition to the main task (i.e., identifying offensive spans in the text). The auxiliary task supports the main task because the toxic words are also a subset of opinion words in the document. As a result, recognizing the opinion words by the offensive span detection network may encourage its predictions to the words that are more likely to be toxic. For this auxiliary task, the offensive span detection network predicts every word $w_i$ to indicate the degree to which the network indicates or determines the word $w_i$ is an opinion word. The offensive span detection network predicts the sequence $Y'=[y_1, y_2, \ldots, y_n]$, where $0<y_i<1$ (predicted by the network) shows the probability of the word $w_i$ to be an opinion word. In some embodiments, the offensive span detection network includes word embedding component 700, refinement network 705, and classification network 710. Word embedding component 700 is an example of, or includes aspects of, the corresponding element described with reference to FIGS. 3 and 4. Refinement network 705 is an example of, or includes aspects of, the corresponding element described with reference to FIGS. 3 and 4. Classification network 710 is an example of, or includes aspects of, the corresponding element described with reference to FIGS. 3 and 4.

In some examples, transfer learning from sentiment analysis is used because the dataset for detecting offensive spans of text does not provide annotation for opinion words. In some embodiments, sentiment analysis network 725 is pre-trained on another dataset that is annotated with the opinion words for sentiment analysis. Then pre-trained sentiment analysis network 725 is employed to guide the offensive span detection network to learn distinguishing opinion words from the context. An annotated dataset is used with the opinion words and the sentiment polarity to train the sentiment analysis network 725. The annotated dataset provides sentiment polarity about specific target or category. As a result, to obtain a sentence-level label, if sentiment polarities provided for a sentence are the same (e.g., sentiment polarities are positive), the sentence is annotated with a common sentiment. The sentence is excluded from training and development data if there are different sentiment polarities provided for the same sentence. Sentiment analysis network 725 includes an embedding component, a LSTM and a classifier.

According to an embodiment, embedding component of sentiment analysis network 725 includes GloVe model. Each word $w_i'$ in the input sentence S' is represented by the vector $x_i'$ which is obtained from the GloVe embedding table. Thereafter, a Bi-LSTM model encodes the input sentence by consuming the vectors $x_i'$ and generates the hidden states $h_i'$ for the i-th word in the sentence. Then, the max-pooled representation of the sentence, $\bar{h}'=\text{MAX\_POOL}(h_1', h_2', \ldots, h_n')$, is consumed by a feed-forward layer followed by softmax to predict the probability distribution over a set of possible sentiment polarity (i.e., positive, negative, and neutral). The probability distribution is formulated as: $P'(\cdot|S')=\text{softmax}(F\ F_p(\bar{h}'))$. Negative loglikelihood $\mathcal{L}_{pre}=-\log(P\cdot|S'))$ is a loss function for training the sentiment analysis network 725. After training, the sentiment analysis network 725 can be used to guide the offensive span detection network. Sentiment analysis network 725 is an example of, or includes aspects of, the corresponding element described with reference to FIG. 3.

The pre-trained sentiment analysis network 725 can predict the sentiment polarity of input text. The opinion words in the input document are identified during the auxiliary task. The pre-trained sentiment analysis network 725 is used to predict the label "neutral" for the input text if the opinion words are excluded from the input text. Therefore, the main offensive span detection network is configured to filter the opinion words from the input document such that the filtered document will be annotated with neutral sentiment by the pre-trained sentiment analysis network 725. The filtering may be performed using filtering component 720. Detail regarding filtering in high-dimensional space (vector representation and weighting) will be described with reference to FIG. 9. In some examples, the input documents for the offensive span detection network convey negative sentiment. Accordingly, the sentiment analysis network 725 should not predict any neutral sentiment for the input documents when none of the opinion words is removed.

The offensive span detection network generates an attention score for each of the set of words based on the refined vector representation. The offensive span detection network generates a weighted vector representation based on the attention score and the refined vector representation. Afterwards, a probability that the weighted vector representation has a neutral sentiment polarity is generated. The system computes an auxiliary loss based on the probability, and the parameters of the refinement network 705 are updated based on the auxiliary loss. In an embodiment, vectors $H=[h_1, h_2, \ldots, h_n]$, i.e., the hidden states of the Bi-LSTM layer of the offensive span detection network, are used to predict the attention scores A. Detail regarding generating attention score and computing the auxiliary loss will be described with reference to FIG. 9.

The parameters of the pre-trained sentiment analysis network 725 are fixed during the training on the auxiliary task. Additionally, in some examples, the training may result in the prediction of all zeros for attention weights A. The regularization loss makes the network model use scores as large as possible for each word. Accordingly, the regularization loss makes the network model to remove relatively few words from the input document:

$$\mathcal{L}_{reg}=|n-\text{SUM}(A)| \qquad (2)$$

where n is the number of words in the input document D and SUM is the sum of all attention scores in the vector A.

One or more embodiments of the present disclosure include the constraint of prediction consistency across similar inputs. The offensive span detection network is trained to make similar predictions for input documents that are similar to each other. Some embodiments of the present disclosure identify similar documents and then measure the consistency of predictions between two similar documents. Criteria include (i) semantics of the document encoded in the vector representations of their words; (ii) the scores the model assigns to each word using its main task feed-forward neural network which indicates the probability of the word to be toxic. Two documents are considered similar to each other if their representations and toxic span predictions of the documents are similar to each other. The consistency of detecting offensive spans of text can be computed based on the cost of converting the representations and the predictions of one document to another.

In some examples, the conversion cost is computed with optimal transport (OT) technique, which calculates the lowest cost of converting a probability distribution to another one. In an embodiment, given the probability distributions p(x) and q(y) over the domains $X$ and $\mathcal{Y}$, and the cost function $C(x, y): X \times \mathcal{Y} \to \mathbb{R}_+$ for mapping $X$ to $\mathcal{Y}$, OT method is used to find the optimal joint distribution $\pi^*(x, y)$ (over $X \times \mathcal{Y}$) with marginals p(x) and q(y), i.e., the cheapest transportation from p(x) to q(y), by solving the following:

$$\pi^*(x, y) = \min_{\pi \in \Pi(x,y)} \int_\mathcal{Y} \int_X \pi(x, y) C(x, y) dx dy \text{ s.t. } x \sim p(x) \text{ and } y \sim q(y) \qquad (3)$$

where $\Pi(x, y)$ is the set of all joint distributions with marginals p(x) and q(y). The integrals in the above equation are replaced with a sum if the distributions p(x) and q(y) are discrete and the joint distribution $\pi^*(x, y)$ is represented by a matrix whose entry (x, y) represents the probability of transforming the data point $x \in X$ to $y \in \mathcal{Y}$ to convert the distribution p(x) to q(y). The entropy-based approximation can be solved using a Sinkhorn algorithm. As a result, the cost of transforming the discrete distribution p(x) to q(y) (i.e., Wasserstein distance $Dist_W$) is formulated as follows: $Dist_W = \Sigma_{x \in X} \Sigma_{y \in Y} \pi^*(x, y) C(x, y)$.

Mapping component 730 is configured to generate document mappings based on two documents in a same mini-batch. In some examples, Wasserstein distance $Dist_W$ is relied on between two documents to compute their consistency of the documents. Mapping component 730 is an example of, or includes aspects of, the corresponding element described with reference to FIG. 3. Detail regarding computing a consistency score based on the similarity score for each of the documents in the batch will be described with reference to FIG. 11.

Training component 715 is configured to compute a multi-task loss including the prediction loss, the consistency loss, the auxiliary loss, and the regularization loss. The multi-task loss is used to update parameters and train the refinement network 705. Training component 715 is an example of, or includes aspects of, the corresponding element described with reference to FIG. 3.

Figure 8:
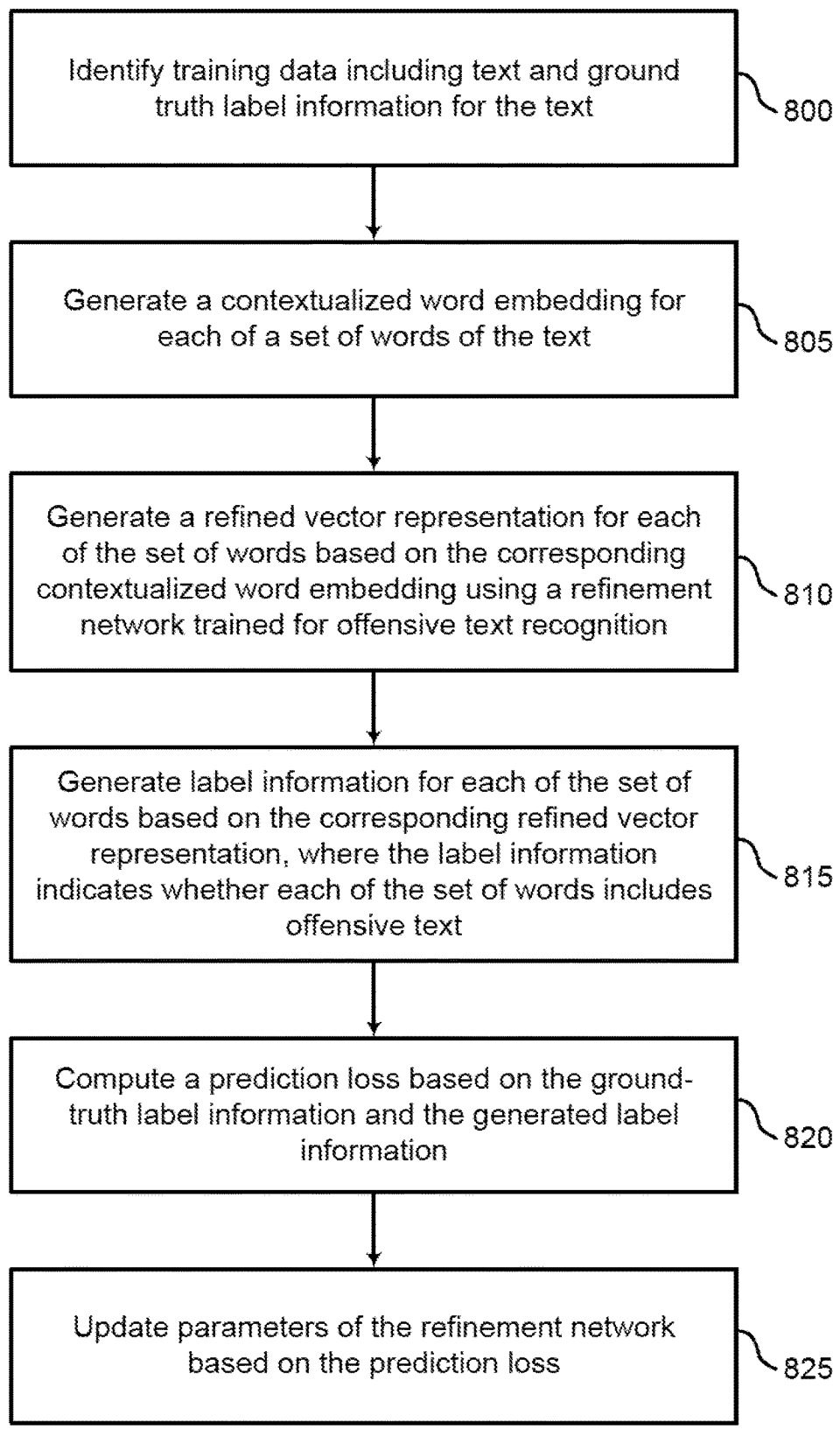
FIG. 8 shows an example of a process for training a refinement network according to aspects of the present disclosure.

FIG. 8 shows an example of a process for training a refinement network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

One or more embodiments of the present disclosure use supervised training techniques. Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

Accordingly, during the training process, the parameters and weights of a natural language processing network (e.g., the refinement network in FIG. 7) are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

At operation 800, the system identifies training data including text and ground truth label information for the text. In some cases, the operations of this step refer to, or may be performed by, a training component as described with reference to FIGS. 3 and 7.

Some embodiments of the present disclosure include a sequence labeling task where the natural language processing network predicts every word $w_i$ in the document D. In some examples, the natural language processing network includes two networks trained or used for different tasks. The main task involves detecting offensive spans of text and the auxiliary task is opinion word extraction. The offensive span detection task (i.e., main network) and opinion word extraction task (i.e., secondary network) are simultaneously trained in a multi-task setting. For example, the main network and the secondary network can be simultaneously trained. In some cases, the main network may also be referred to as an offensive span detection network.

In some embodiments, dataset for detecting offensive spans of text is not annotated with opinion words, therefore, the system applies transfer learning technique so that a pre-trained model on a sentiment analysis dataset can supervise the offensive span detection model (i.e., the main network) for the auxiliary task. One or more embodiments of the present disclosure regularize the offensive span detection network by enforcing its predictions on similar inputs consistent. Optimal transport technique at the batch level is used to find similar inputs and compute their consistency.

At operation 805, the system generates a contextualized word embedding for each of a set of words of the text. Words of text (e.g., document) are input to a word embedding component to generate the respective contextualized word embedding. In some examples, the word embedding component is a pre-trained transformer network. In some cases, the operations of this step refer to, or may be performed by, a word embedding component as described with reference to FIGS. 3, 4, and 7.

At operation 810, the system generates a refined vector representation for each of the set of words based on the corresponding contextualized word embedding using a refinement network trained for offensive text recognition. In some cases, the operations of this step refer to, or may be performed by, a refinement network as described with reference to 3, 4, and 7.

At operation 815, the system generates label information for each of the set of words based on the corresponding refined vector representation, where the label information indicates whether each of the set of words includes offensive text. In some cases, the operations of this step refer to, or may be performed by, a classification network as described with reference to FIGS. 3, 4, and 7.

At operation 820, the system computes a prediction loss based on the ground-truth label information and the generated label information. In some cases, the operations of this step refer to, or may be performed by, a training component as described with reference to FIGS. 3 and 7.

In some examples, a supervised training model includes a loss function that compares predictions of the natural language processing network with ground truth training data. The term loss function refers to a function that impacts how a machine learning model is trained in a supervised learning model. Specifically, during each training iteration, the output of the model (e.g., the offensive span detection network) is compared to the known annotation information in the training data. The loss function provides a value for how close the predicted annotation data is to the actual annotation data. After computing the loss function, the parameters of the model are updated accordingly and a new set of predictions are made during the next iteration.

A cross-entropy loss in word-level (i.e., negative log-likelihood) is used to train the main network (i.e., offensive span detection network). The loss function is formulated as follows:

$$\mathcal{L}_{main} = -\log(P(l_i|D,w_i)) \quad (4)$$

where $l_i$ is the ground-truth label for the word $w_i$ in the document D in training data.

A loss function with trade-off parameters α, β and γ is used to train the main network, i.e., the offensive span detection network:

$$\mathcal{L} = \mathcal{L}_{main} + \alpha * \mathcal{L}_{aux} + \beta * \mathcal{L}_{reg} + \gamma * \mathcal{L}_{cons} \quad (5)$$

In the equation above, $\mathcal{L}_{aux}$ is auxiliary loss, $\mathcal{L}_{reg}$ is regularization loss, $\mathcal{L}_{cons}$ is consistency loss. Detail regarding each of the loss terms will be described with reference to FIGS. 9 and 11.

At operation 825, the system updates parameters of the refinement network based on the prediction loss. In some cases, the operations of this step refer to, or may be performed by, a training component as described with reference to FIGS. 3 and 7.

Figure 9:
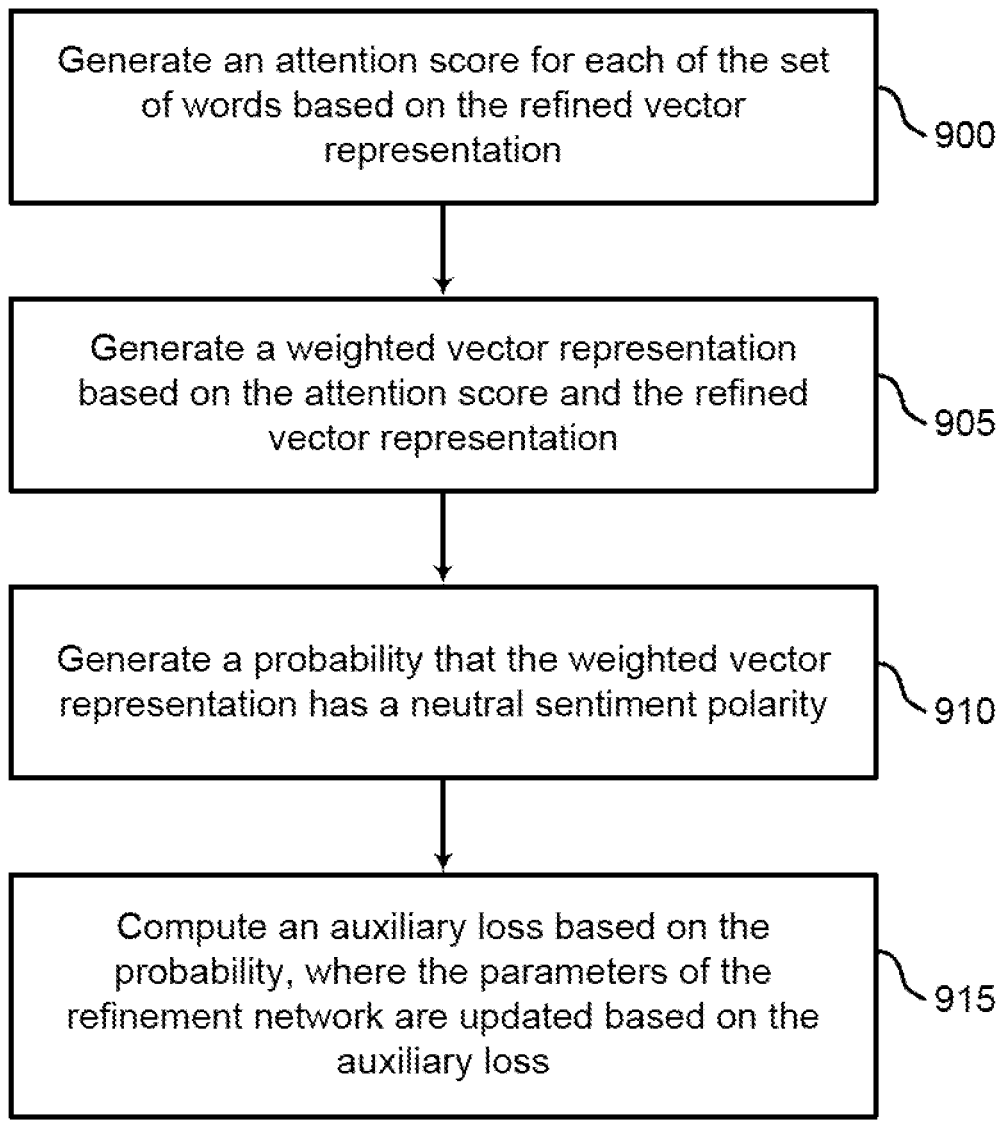
FIG. 9 shows an example of a process for training a refinement network based on an auxiliary loss according to aspects of the present disclosure.

FIG. 9 shows an example of a process for training a refinement network based on an auxiliary loss according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 900, the system generates an attention score for each of the set of words based on the refined vector representation. In some cases, the operations of this step refer to, or may be performed by, a training component as described with reference to FIGS. 3 and 7.

At operation 905, the system generates a weighted vector representation based on the attention score and the refined vector representation. In some cases, the operations of this step refer to, or may be performed by, a training component as described with reference to FIGS. 3 and 7.

At operation 910, the system generates a probability that the weighted vector representation has a neutral sentiment polarity. In some cases, the operations of this step refer to, or may be performed by, a training component as described with reference to FIGS. 3 and 7.

In an embodiment, vectors $H=[h_1, h_2, \ldots, h_n]$, i.e., the hidden states of the Bi-LSTM layer of the offensive span detection network, are used to predict the attention scores $A=[a_1, a_2, \ldots, a_n]$ where $0 < a_i < 1$. A serves as the predicted label vector Y' described above. A feed-forward neural network $a_i = \sigma(F\ F_a(h_i))$ is used where σ is the sigmoid activation function. Thereafter, the attention scores A are multiplied with the hidden states H to obtain the weighted vectors H": $h_1" = a_i * h_i$. The weighing encourages the sentiment analysis network 725 to filter words expected to be opinion words. Next, the max-pooled representation of the weighted vectors H", i.e., $\bar{h}" = \text{MAX\_POOL}(h_1", h_2", \ldots, h_n")$, is input to the pre-trained sentiment analysis network 725 to obtain the probability distribution $P"(\cdot|D) = SA(h")$. In an embodiment, filtering component 720 may be used to perform filtering and weighting in the vector space to produce filtered vectors. The filtered vectors are input to sentiment analysis network 725.

At operation 915, the system computes an auxiliary loss based on the probability, where the parameters of the refinement network are updated based on the auxiliary loss. In some cases, the operations of this step refer to, or may be performed by, a training component as described with reference to FIGS. 3 and 7.

In some embodiments, the offensive span detection network includes the refinement network 705 (see FIG. 7). Such training setup ensures the filtered document represented by weighted vectors H" is excluded from conveying any sentiment polarity. The loss function of training the offensive span detection network on the auxiliary task is formulated as follows:

$$\mathcal{L}_{aux} = -\log(P"(\text{neutral}|D)) \quad (6)$$

where $\mathcal{L}_{aux}$ may also be referred to as auxiliary loss.

Figure 10:
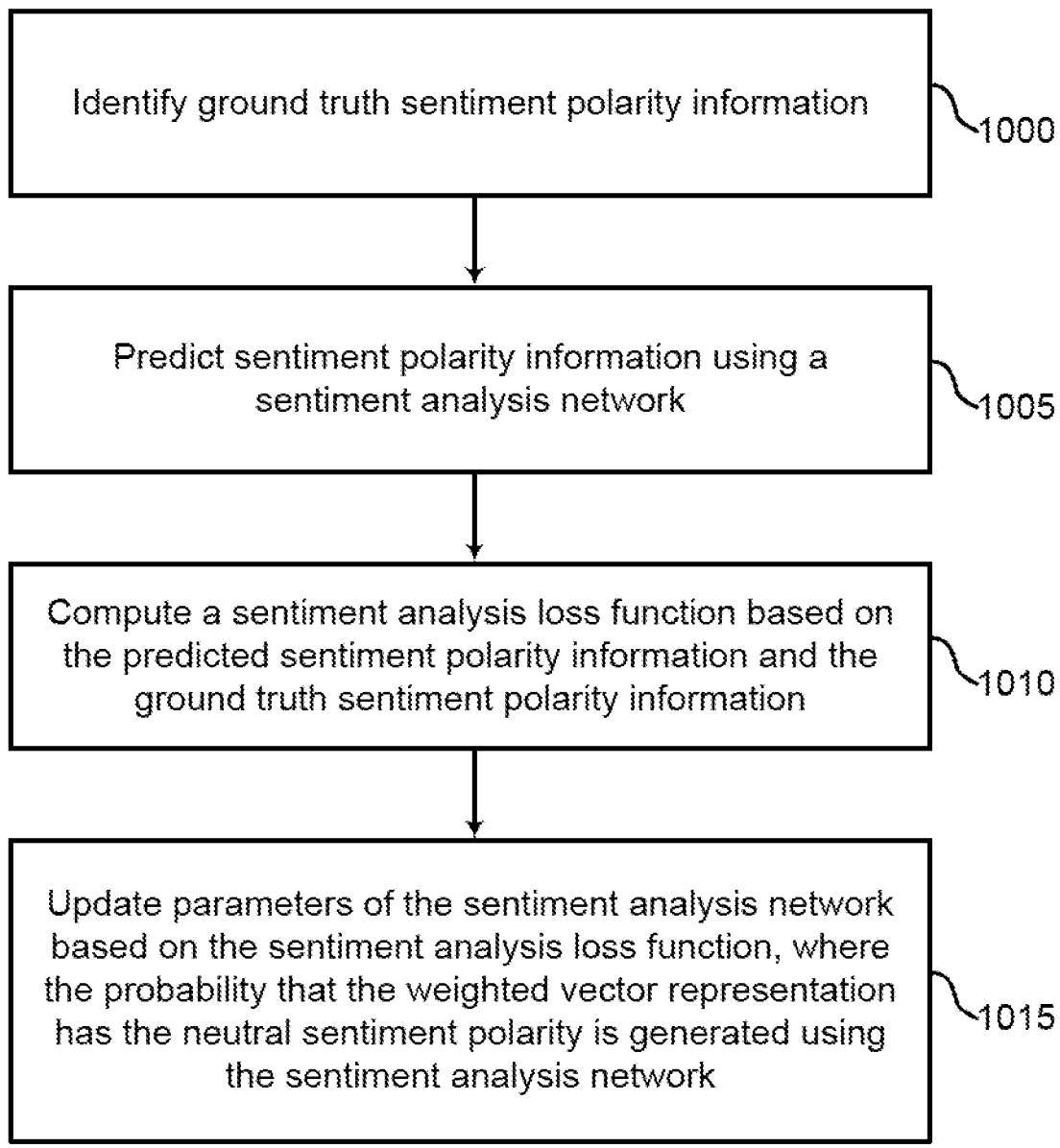
FIG. 10 shows an example of a process for training a sentiment analysis network according to aspects of the present disclosure.

FIG. 10 shows an example of a process for training a sentiment analysis network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1000, the system identifies ground truth sentiment polarity information. Possible sentiment polarity labels may include positive, negative, and neutral. In some cases, the operations of this step refer to, or may be performed by, a training component as described with reference to FIGS. 3 and 7.

At operation 1005, the system predicts sentiment polarity information using a sentiment analysis network. In some cases, the operations of this step refer to, or may be performed by, a sentiment analysis network as described with reference to FIGS. 3 and 7.

At operation 1010, the system computes a sentiment analysis loss function based on the predicted sentiment polarity information and the ground truth sentiment polarity information. Detail regarding sentiment analysis network is also described above with reference to FIG. 7. In some cases, the operations of this step refer to, or may be performed by, a training component as described with reference to FIGS. 3 and 7.

At operation 1015, the system updates parameters of the sentiment analysis network based on the sentiment analysis loss function, where the probability that the weighted vector representation has the neutral sentiment polarity is generated using the sentiment analysis network. In some cases, the operations of this step refer to, or may be performed by, a training component as described with reference to FIGS. 3 and 7. After training, the pre-trained sentiment analysis network is used to guide the main offensive span detection network. The pre-trained sentiment analysis network can predict the sentiment polarity of input text. In some examples that the opinion words are excluded from the input text, the sentiment analysis network is likely going to predict the label neutral for the input text. Accordingly, the main offensive span detection network is trained to filter out the opinion words from the input document such that the filtered document will be annotated with neutral sentiment by the sentiment analysis network.

Figure 11:
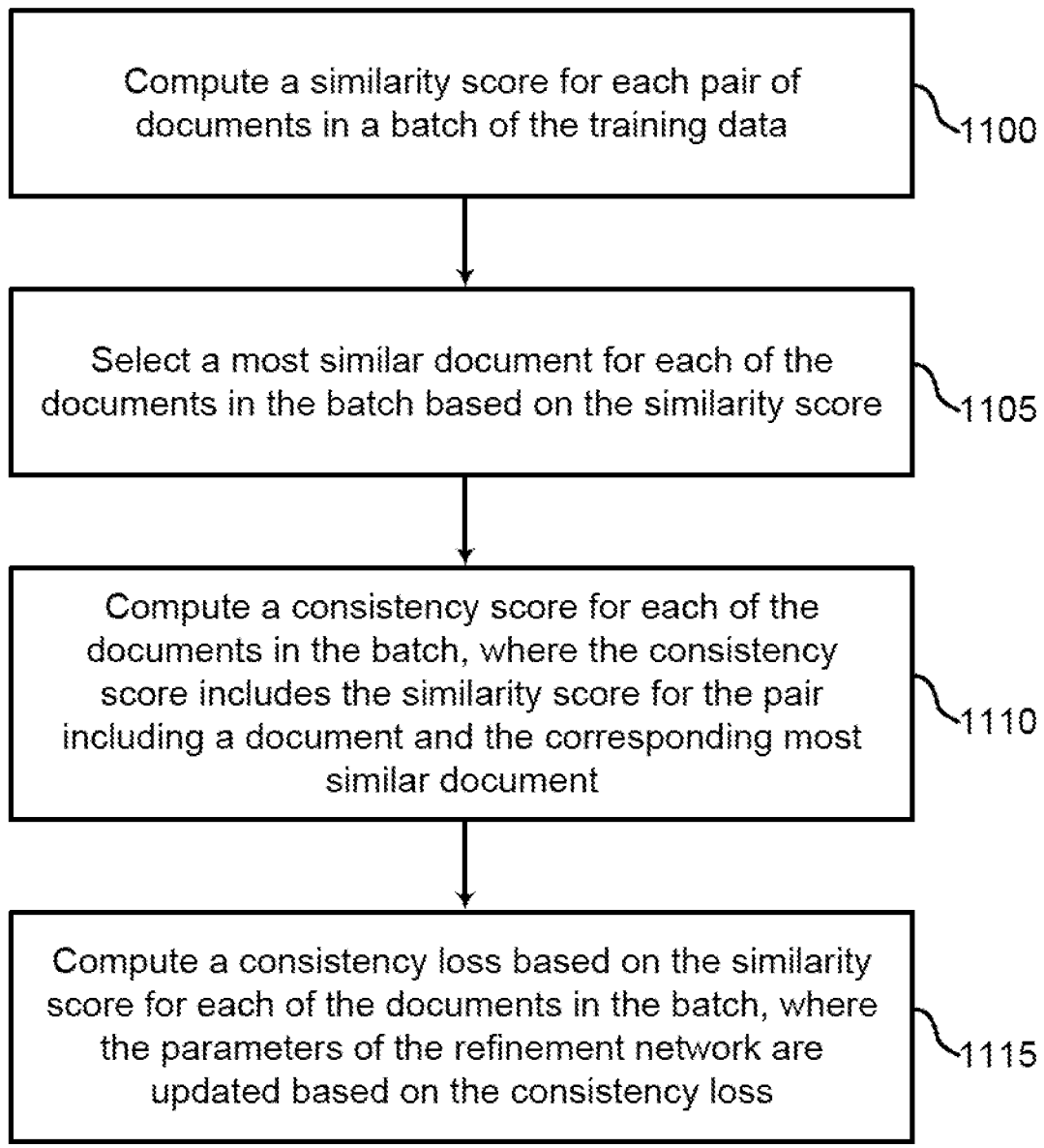
FIG. 11 shows an example of a process for training a refinement network based on a consistency loss according to aspects of the present disclosure.

FIG. 11 shows an example of a process for training a refinement network based on a consistency loss according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1100, the system computes a similarity score for each pair of documents in a batch of the training data. In some cases, the operations of this step refer to, or may be performed by, a mapping component as described with reference to FIGS. 3 and 7.

At operation 1105, the system selects a most similar document for each of the documents in the batch based on the similarity score. In some cases, the operations of this step refer to, or may be performed by, a mapping component as described with reference to FIGS. 3 and 7.

In some embodiments, Wasserstein distance $Dist_W$ is used between two documents to compute their consistency of the documents (see computation of $Dist_W$ in FIG. 7). For every pair of $(D_k, D_l)$ where $D_1$ and $D_2$ are two documents in the same mini-batch, the domain X is defined over the word representations of the document $D_k$, i.e., $H_k$, and the domain $\mathcal{Y}$ is defined over the word representations of the document $D_l$, i.e., $H_l$. Additionally, the probability of the label 0 for each word of the document $D_k$ and $D_l$ predicted by the main task model is fed into a softmax function to define the distributions p(x) and q(y). The probability of $p(x_i)$ is formulated as below:

$$p(x_i) = \frac{e^{P(0|D_k, w_i)}}{\sum_{j \leq n} e^{P(0|D_k, w_j)}} \quad (7)$$

Similarly, the probability of $q(y_j)$ is computed using the probability $P(0|D_l, w_j)$. The cost function $C(x_i, y_j)$ is defined using the Euclidean distance between the two vector representations $h_i$ and $h_j$ for the word $w_i$ of $D_k$ and the word $w_j$ of $D_l$: $C(x_i, y_j) = h_i - h_j$. OT method is used with the cost function and probability distribution to compute the Wasserstein distance $Dist_W^{k,l}$ between the document $D_k$ and $D_l$ in the same mini-batch. Finally, the document $D'_k$ is selected as the most similar document to $D_k$ where:

$$k' = \operatorname{argmax}_l Dist_W^{k,l} \quad (8)$$

At operation 1110, the system computes a consistency score for each of the documents in the batch, where the consistency score includes the similarity score for the pair including a document and the corresponding most similar document. In some cases, the operations of this step refer to, or may be performed by, a mapping component as described with reference to FIGS. 3 and 7.

At operation 1115, the system computes a consistency loss based on the similarity score for each of the documents in the batch, where the parameters of the refinement network are updated based on the consistency loss. In some cases, the operations of this step refer to, or may be performed by, a training component as described with reference to FIGS. 3 and 7.

The consistency cost of the document $D_k$ is defined as $Cons_k = Dist_W^{k,k'}$. The consistency loss is computed by averaging the consistency cost for all documents in the same mini-batch:

$$\mathcal{L}_{cons} = \frac{Cons_1 + Cons_2 + \ldots + Cons_{|B|}}{|B|} \quad (9)$$

where |B| is mini-batch size.

Performance of apparatus, systems and methods of the present disclosure have been evaluated, and results indicate embodiments of the present disclosure have obtained increased performance over existing technology. Example experiments demonstrate that the natural language processing network outperforms conventional systems.

One or more embodiments of the present disclosure assess the effectiveness of the natural language processing apparatus by evaluating it on dataset for detecting offensive spans of text. The dataset includes 7939 training documents, 690 development documents and 2000 test documents. The natural language processing apparatus herein is evaluated against existing systems such as Bi-LSTM and BERT systems.

The Bi-LSTM system includes a Bi-LSTM network which takes the GloVe embedding of the words and feeds the hidden states of the Bi-LSTM into a feed-forward neural network to predict the toxicity of the words.

The BERT system feeds the input document into the pre-trained $BERT_{base}$ model. The system represents each word using the hidden states of the last layer in BERT and then feeds the hidden states into a feed-forward neural network to make the prediction. Unlike the natural language processing apparatus described herein, parameters of the BERT model are fine-tuned during training. The results are recorded and demonstrate that the natural language processing apparatus described herein significantly increases the performance on the test set.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for natural language processing, comprising:
receiving a span of text comprising an offensive span and a non-offensive span;
generating a contextualized word embedding for each of a plurality of words of the span of text;

generating a refined vector representation for each of the plurality of words based on corresponding contextualized word embedding using a refinement network trained for offensive text recognition using a multi-task loss function including a prediction loss and an auxiliary loss, where the prediction loss is based on a classification network that is applied to an output of the refinement network, and wherein the auxiliary loss is based on a sentiment analysis network that is applied to the output of the refinement network after filtering the output using a filtering component; and filtering, using the filtering component, the offensive span based on the refined vector representation to obtain a filtered text.

2. The method of claim 1, wherein:
the multi-task loss function includes a consistency loss based on a similarity score for each of documents in a training batch.

3. The method of claim 1, further comprising:
generating label information for each of the plurality of words based on the corresponding refined vector representation, wherein the label information comprises a first value for a first label, a second value for a second label, and a third value for a third label, wherein the first label indicates a word is a first word of the offensive span, the second label indicates the word is within the offensive span, and the third label indicates the word is not within the offensive span.

4. The method of claim 3, wherein:
the label information comprises a probability distribution over a plurality of labels related to the offensive span.

5. The method of claim 1, further comprising:
identifying a word comprising a plurality of word pieces;
generating a vector representation for each of the plurality of word pieces; and
averaging the vector representation for each of the plurality of word pieces to produce the contextualized word embedding.

6. An apparatus comprising:
at least one processor; and
at least one memory including instructions executable by the at least one processor to:
receive a span of text comprising an offensive span and a non-offensive span;
generate a contextualized word embedding for each of a plurality of words of the span of text;
generate a refined vector representation for each of the plurality of words based on corresponding contextualized word embedding using a refinement network trained for offensive text recognition using a multi-task loss function including a prediction loss and an auxiliary loss, where the prediction loss is based on a classification network that is applied to an output of the refinement network, and wherein the auxiliary loss is based on a sentiment analysis network that is applied to the output of the refinement network after filtering the output using a filtering component; and filter, using the filtering component, the offensive span based on the refined vector representation to obtain a filtered text.

7. The apparatus of claim 6, wherein:
the multi-task loss function includes a consistency loss based on a similarity score for each of documents in a training batch.

8. The apparatus of claim 6, further comprising instructions executable by the at least on processor to:
generate label information for each of the plurality of words based on the corresponding refined vector representation, wherein the label information comprises a first value for a first label, a second value for a second label, and a third value for a third label, wherein the first label indicates a word is a first word of the offensive span, the second label indicates the word is within the offensive span, and the third label indicates the word is not within the offensive span.

9. The apparatus of claim 8, wherein:
the label information comprises a probability distribution over a plurality of labels related to the offensive span.

10. The apparatus of claim 6, further comprising instructions executable by the at least one processor to:
identify a word comprising a plurality of word pieces;
generate a vector representation for each of the plurality of word pieces; and
average the vector representation for each of the plurality of word pieces to produce the contextualized word embedding.

11. A non-transitory computer readable medium storing code for natural language processing, the code comprising instructions executable by at least one processor to:
receive a span of text comprising an offensive span and a non-offensive span;
generate a contextualized word embedding for each of a plurality of words of the span of text;
generate a refined vector representation for each of the plurality of words based on corresponding contextualized word embedding using a refinement network trained for offensive text recognition using a multi-task loss function including a prediction loss and an auxiliary loss, where the prediction loss is based on a classification network that is applied to an output of the refinement network, and wherein the auxiliary loss is based on a sentiment analysis network that is applied to the output of the refinement network after filtering the output using a filtering component; and filter, using the filtering component, the offensive span based on the refined vector representation to obtain a filtered text.

12. The non-transitory computer readable medium of claim 11, wherein:
the multi-task loss function includes a consistency loss based on a similarity score for each of documents in a training batch.

13. The non-transitory computer readable medium of claim 11, the code further comprising instructions executable by the at least one processor to:
generate label information for each of the plurality of words based on the corresponding refined vector representation, wherein the label information comprises a first value for a first label, a second value for a second label, and a third value for a third label, wherein the first label indicates a word is a first word of the offensive span, the second label indicates the word is within the offensive span, and the third label indicates the word is not within the offensive span.

14. The non-transitory computer readable medium of claim 13, wherein:
the label information comprises a probability distribution over a plurality of labels related to the offensive span.

15. The non-transitory computer readable medium of claim 11, the code further comprising instructions executable by the at least one processor to:
- identify a word comprising a plurality of word pieces;
- generate a vector representation for each of the plurality of word pieces; and
- average the vector representation for each of the plurality of word pieces to produce the contextualized word embedding.

* * * * *